United States Patent Office 3,494,895
Patented Feb. 10, 1970

3,494,895
PROCESS FOR PREPARING POLYETHYLENEUREA
Jorg Strickrodt, Hannover, Gerhard Blume, and Gerhard Hoffmann, Wolfenbuttel, Germany, assignors to Salziter Chemie GmbH, Hannover, Germany
No Drawing. Filed Sept. 21, 1967, Ser. No. 669,408
Claims priority, application Germany, Sept. 27, 1966, S 106,130
Int. Cl. C08g 22/02
U.S. Cl. 260—77.5        8 Claims

ABSTRACT OF THE DISCLOSURE

Ethyleneurea is converted into polyethyleneurea by heating the ethyleneurea in the presence of ethylenediamine in order to obtain polymerization and increase the yield of polymer. Polymerization can be carried out simultaneously with the formation of ethyleneurea from ethylenediamine and COS. Polymerization can take place in a diluent and can be accelerated by a catalyst.

---

In the preparation of ethyleneurea by the reaction of COS with ethylenediamine in boiling n-propanol, the formation of up to 3% polyethyleneurea, as a by-product, has been observed. Further research work resulted in a novel and simple process for the prepration of polyethyleneurea.

According to said process, polyethyleneurea can be produced by heating ethyleneurea in the presence of ethylenediamine in order to form polyethyleneurea by polymerization.

It has been further found that by carrying out the process of the invention in the presence of a relatively high boiling solvents, e.g. chlorobenzene (boiling point 132° C.), the amount of ployethyleneurea is increased to 11%. By using as solvent p-chloroxylene (boiling point 200° C.) 25% polyethyleneurea was obtained. These reactions were carried out by introducing ethylenediamine and COS in about equivalent amounts, simultaneously into the boiling dissolving or dispersing liquid.

In carrying out tests in order to determine the effect of ethylenediamine concentration on the formation of the polymer, ethylenediamine was reacted with COS in the absence of solvents or dispersing agents in the temperature range of 117–150° C. In these tests the yield of polyethyleneurea amounted to 23%.

It has been found that by heating ethyleneurea in the presence of ethylenediamine at temperatures in the range of 130–250° C. polyethyleneurea is likewise formed. After terminating the reaction, the ethylenediamine can be recovered quantitatively. It was, however, unexpectedly found that ethyleneurea polycondenses only in the presence of ethylenediamine, in satisfactory yields. It is assumed that the ethyleneurea and ethylenediamine form an addition compound which decomposes with the formation of chainlike condensation products and ethylendiamine.

The process of the present invention is preferably carried out under normal atmospheric pressure and preferably equimolecular amounts of ethylenediamine are used. Molar amounts of 0.1, based on ethyleneurea, result only in very small conversion. By extending the reaction period over 10 hours, the degree of polycondensation can be only slightly increased.

We have further found that formation of polyethyleneurea is increased by the presence of small amounts of catalytically acting substances which accelerate polymerization. Such substances are, for example, alkalihydroxides, alkaline earth hydroxides, and also mineral acids, aluminum chloride, and $BF_3$. Upon the addition of such accelerators, up to 50% of polyethyleneurea are found in finely distributed form in the molten ethyleneurea.

The following examples illustrate some specific embodiments of the invention to which the invention is not limited.

EXAMPLE 1

120 g. (2 mols) of ethylenediamine and 150 liter of a gas mixture containing about 30–33% by vol. of COS, are introduced simultaneously and continuously during 5 hours into a 1-liter round flask containing 500 ml. of p-chloroxylene and provided with a stirrer and reflux condenser. The reaction temperature is kept at about 190–200° C. After 5 hours the p-chloroxylene is distilled off under vacuum and the remaining molten mass is poured into 500 ml. of water in order to dissolve the ethyleneurea. The residue which consists of polyethyleneureau is filtered off, washed twice with hot water and dried under vacuum. The yield amounts to 43 g. of polyethyleneurea, which corresponds to 25% of the theory.

EXAMPLE 2

86 g. (1 mol) of ethyleneurea are stirred for 10 hours with 60 g. (1 mol) of ethylenediamine in a round flask provided with reflux condenser and, a feed pipe for the introduction of $N_2$ at 132° C. Subsequently, the ethylenediamine is distilled off. The residual molten mass is allowed to cool, pulverized and separated from unreacted ethyleneurea by repeatedly boiling it with water. The yield of polyethyleneurea amounts to 26 g. corresponding to 30%.

EXAMPLE 3

86 g. (1 mol) of ethyleneurea and 6 g. (0.1 mol) of ethylenediamine, and 1 g. of potassium hydroxide are stirred at 130° C. in a nitrogen atmosphere for 10 hours. Further processing of the resulting product is carried out in the manner described in the above Example 2. The yield of polyethyleneurea amounts to 43.3 g., corresponding to 50.4%.

It will be appreciated that this invention is not limited to the specific details described above and may be carried out with various modifications.

As additional examples of high-boiling solvents, such as NN-dimethyl-formamide, phenol, cresol can be used. Examples of dispersing agents are aliphatic and aromatic hydrocarbons, water, alcohols, ethyleneurea. The gas mixture used in the above Example 1 contains in addition to COS, the ingredients $N_2$, CO, $CO_2$. As additional examples of accelerators of polymerization, KOH, NaOH, $Ca(OH)_2$, $Ba(OH)_2$, $Mg(OH)_2$, the teritary amines triethanolamine, tert-butylamine, HCl, $H_3PO_4$, are mentioned. The vacuum used for distillation or drying is in the range of 1 mm. Hg to 100 mm Hg. The yields stated are by weight and calculated on the theory. As inert gases nitrogen, CO or $CO_2$ can be used. The parts and percent are by weight if not otherwise stated.

What is claimed is:
1. A process for producing polyethyleneurea, consisting of heating ethyleneurea and ethylenediamine in substantially equimolecular amounts to a temperature of 130–

250° C. for about 5–10 hours and separating the ethylenediamine from the polyethyleneurea formed.

2. A process as claimed in claim 1, in which the process is carried out in molten phase.

3. A process as claimed in claim 1, in which an accelerator for polymerizing ethyleneurea, selected from the group consisting of potassium hydroxide and sodium hydroxide is used.

4. A process as claimed in claim 1, in which the process is carried out in a high boiling solvent selected from the group consisting of chlorobenzene, p-chloroxylene, N,N-dimethyl-formamide, phenol, and cresol.

5. A process for producing polyethyleneurea, consisting of heating ethyleneurea, ethylenediamine and carbonoxysulfide to a temperature of 130–250° C. and separating ethylenediamine from polyethyleneurea formed.

6. A process as claimed in claim 5, in which the process is carried out in molten phase.

7. A process as claimed in claim 5, in which an accelerator for polymerizing ethyleneurea, selected from the group consisting of potassium hydroxide and sodium hydroxide is used.

8. A process as claimed in claim 5, in which the process is carried out in a high-boiling solvent selected from the group consisting of chlorobenzene, p-chloroxylene, N,N-dimethylformamide and cresol.

References Cited

UNITED STATES PATENTS

| | | | |
|---|---|---|---|
| 2,392,132 | 1/1946 | Dreyfus | 260—2 |
| 2,497,309 | 2/1950 | Larson et al. | 260—309 |
| 2,820,024 | 1/1958 | Van de Kerk | 260—77.5 |
| 2,892,843 | 6/1959 | Levine | 260—309.7 |
| 3,042,658 | 7/1962 | Libby | 260—77.5 |
| 3,046,254 | 7/1962 | Inaba et al. | 260—77.5 |
| 3,073,800 | 1/1963 | Poon | 260—69 |
| 3,185,656 | 5/1965 | Gabler et al. | 260—30.2 |
| 3,223,682 | 12/1965 | Gabler et al. | 260—77.5 |

DONALD E. CZAJA, Primary Examiner

H. S. COCKERAM, Assistant Examiner

U.S. Cl. X.R.

260—33.8, 33.4, 32.6